(12) United States Patent
Chen et al.

(10) Patent No.: US 7,065,623 B2
(45) Date of Patent: Jun. 20, 2006

(54) BANDWIDTH UTILIZATION IN A PPRC SYSTEM

(75) Inventors: James C. Chen, Tucson, AZ (US); Olympia Gluck, Haifa (IL); Gabriel G. Walder, K. Haim (IL); Yelena Zilberstein, Haifa (IL); Warren K. Stanley, Tucson, AZ (US); Edward H. Lin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 10/719,536

(22) Filed: Nov. 20, 2003

(65) Prior Publication Data

US 2005/0114566 A1 May 26, 2005

(51) Int. Cl.
*G06F 12/00* (2006.01)
(52) U.S. Cl. .................. 711/169; 711/171; 711/172; 710/33; 710/38; 710/57
(58) Field of Classification Search ............... 711/169, 711/171, 172, 161, 162; 710/30, 33, 34, 710/35, 38, 57, 29; 709/230, 236
See application file for complete search history.

(56) References Cited

U.S. PATENT DOCUMENTS 4,445,176 A * 4/1984 Burk et al. ................. 709/231
5,892,925 A * 4/1999 Aditya et al. ............... 709/230
6,920,537 B1 * 7/2005 Ofek et al. .................. 711/163

\* cited by examiner

*Primary Examiner*—Matthew D. Anderson
*Assistant Examiner*—Ryan A. Dare
(74) *Attorney, Agent, or Firm*—Dan Shifrin

(57) ABSTRACT

Methods, system and computer program product are provided to improve the efficiency of data transfers in a PPRC environment. A block of data to be transferred is divided into tracks. Each track is allocated to a data mover task control block (TCB) with a master TCB being assigned to supervise the data mover TCBs. The tracks are then transferred from the primary storage controller to the secondary controller in a piped fashion over a link coupling the primary and secondary storage controllers. However, the usage of resources is monitored by a resource management algorithm and, if too many TCBs are being used for a transfer or if the supply of data mover TCBs is exhausted, the transfer is automatically switched to a serial, non-piped transfer with the master TCB serving as the data mover TCB for the remaining tracks. In addition, the various links coupling the primary and secondary storage controllers is monitored to determine which link will provide the fastest transfer. If, during a transfer of tracks over one link, a faster link is identified, the transfer may be switched to the second, faster link.

31 Claims, 3 Drawing Sheets

BANDWIDTH UTILIZATION IN A PPRC SYSTEM

TECHNICAL FIELD

The present invention relates generally to peer-to-peer remote copy (PPRC) storage systems and, in particular, to increasing the efficiency with which write operations are performed between a primary storage control unit and a secondary storage control unit.

BACKGROUND ART

Data integrity is a critical factor in large computer data systems. Consequently, backup data storage systems have been developed to prevent the loss of data in the event of various types of failures. One such backup system, known as "peer-to-peer remote copy" (PPRC), maintains a separate, consistent copy of data. As illustrated in FIG. 1, in a PPRC system 100, data generated by a host device 110 is stored on a primary storage unit 120. A copy of the data is also transmitted synchronously, such as over a fibre channel network 130, and stored on a secondary storage unit 140. Because of the flexibility of network interconnections, the primary and secondary units 120 and 140 may be physically located remote from the host 110. And, for additional data security, the primary and secondary units 120 and 140 may be (but need not be) physically located distant from each other, thereby reducing the likelihood of a single disaster simultaneously harming both the primary and secondary units 120 and 140. It will be appreciated that the primary and secondary units 120 and 140 may be the same physical unit, divided logically into two.

Typically, a block of data to be copied to the secondary unit 140 is first received by the primary unit 120 as a plurality of substantially equal-size units or tracks. A first track is then associated with a tack, thread or other operating system unit of execution, such as a task control block (TCB) and transferred from the primary unit to the secondary over one of the links. Upon successful receipt of the track, the secondary replies with a "complete" status message. The TCB is then released and the next track may then be associated with the TCB and transferred to the secondary. The process is repeated until all of the tracks have been successfully transferred to the secondary. Such a serial operation may fail to take full advantage of the bandwidth available between the primary and secondary storage units.

It is also possible to transfer tracks in a "piped" fashion in which the transfer of a second track begins before the status message has been received from the secondary unit confirming successful receipt of the first track. However, there may be insufficient resources in the primary unit to complete the transfer of all of the tracks of a block of data in such a fashion. Additionally, if too many resources are allocated to piping tracks, other operations may not have sufficient resources and may be delayed.

Consequently, it remains desirable to provide a more efficient and flexible process for transferring blocks of data from a primary storage unit to a secondary storage unit.

SUMMARY OF THE INVENTION

The present invention provides method, system and computer program product to improve the efficiency of data transfers in a PPRC environment. A block of data to be transferred is divided into tracks. Each track is allocated to a data mover task control block (TCB) with a master TCB being assigned to supervise the data mover TCBs. The tracks are then transferred from the primary storage controller to the secondary controller in a piped fashion over a link coupling the primary and secondary storage controllers. However, the usage of resources is monitored by a resource management algorithm and, if too many TCBs are being used for a transfer (or if the supply of data mover TCBs is exhausted), the transfer is automatically switched whereby the master TCB now serves as the data mover TCB for the remaining tracks.

In addition, the various links coupling the primary and secondary storage controllers are monitored to determine which link will provide the fastest transfer. If, during a transfer of tracks over one link, a faster link is identified, the transfer may be switched to the second, faster link.

Thus, the efficiency of a transfer of data is improved and the utilization of the bandwidth of links is similarly improved.

DETAILED DESCRIPTION OF THE PREFERRED EMBODIMENT

Figure 1:
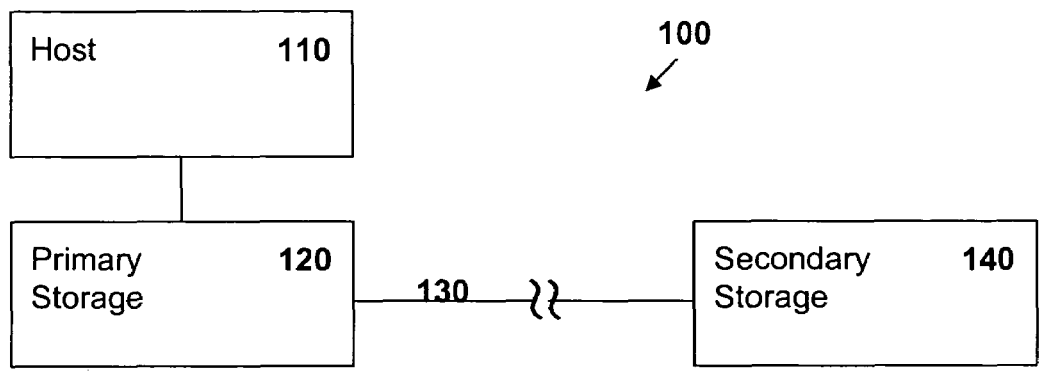
FIG. 1 is a block diagram of an exemplary PPRC data storage system.
Figure 2:
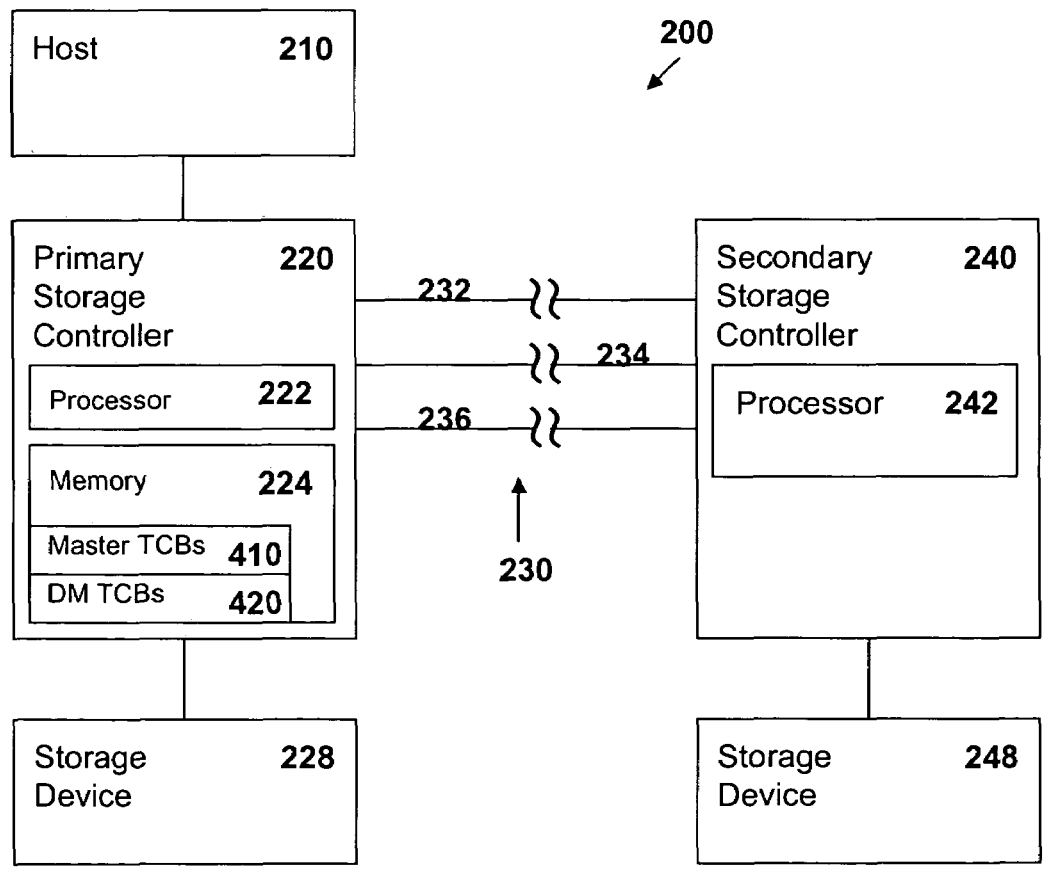
FIG. 2 is a block diagram of a data storage system in which the present invention may be implemented.

FIG. 2 is a block diagram of a data storage system 200 in which the present invention may be implemented. The system 200 may be a PPRC system in which a host device 210 transmits data to a primary storage controller 220 for storage on a storage device (such as an array of disk dives) 228. Additionally, the primary storage controller 220 transfers a copy of the data to a secondary storage controller 240, such as over a network 230, for storage on a storage device 248. The secondary storage controller 240 and storage device 248 are preferably, but not necessarily, located remote from the primary storage controller 220. The primary storage controller 220 further includes a processor 222 for executing instructions relating to the transfer of the copies of data to the secondary storage controller 240. The primary storage controller 220 also includes a memory 224, portions of which are allocated to tasks, threads or other operating system units of execution, such as task control blocks (TCBs). The task control blocks may include master TCBs 410 And a plurality of data mover TCBs 420 associated with each master TCB 410.

The secondary storage controller also includes a processor 242 to execute instructions relating to the receipt and ultimate storage of data.

The network 230 preferably includes a plurality of links 232, 234 and 236 through which data and messages may be transferred between the primary and secondary storage controllers 220 and 240. Although three such links 232, 234 and 236 are shown in FIG. 2, it will be appreciated that any number of links may be provided. The network 230 and the links 232, 234 and 236 are illustrated as directly connecting the primary storage controller 220 and the secondary storage controller 230. However, it will be appreciated that such a depiction is merely for clarity in the Fig. and that the illustrated network 230 and links 232, 234 and 236 represent any path, direct or indirect, by which the primary storage controller 220 and the secondary storage controller 230 may be coupled.

Figure 3A:
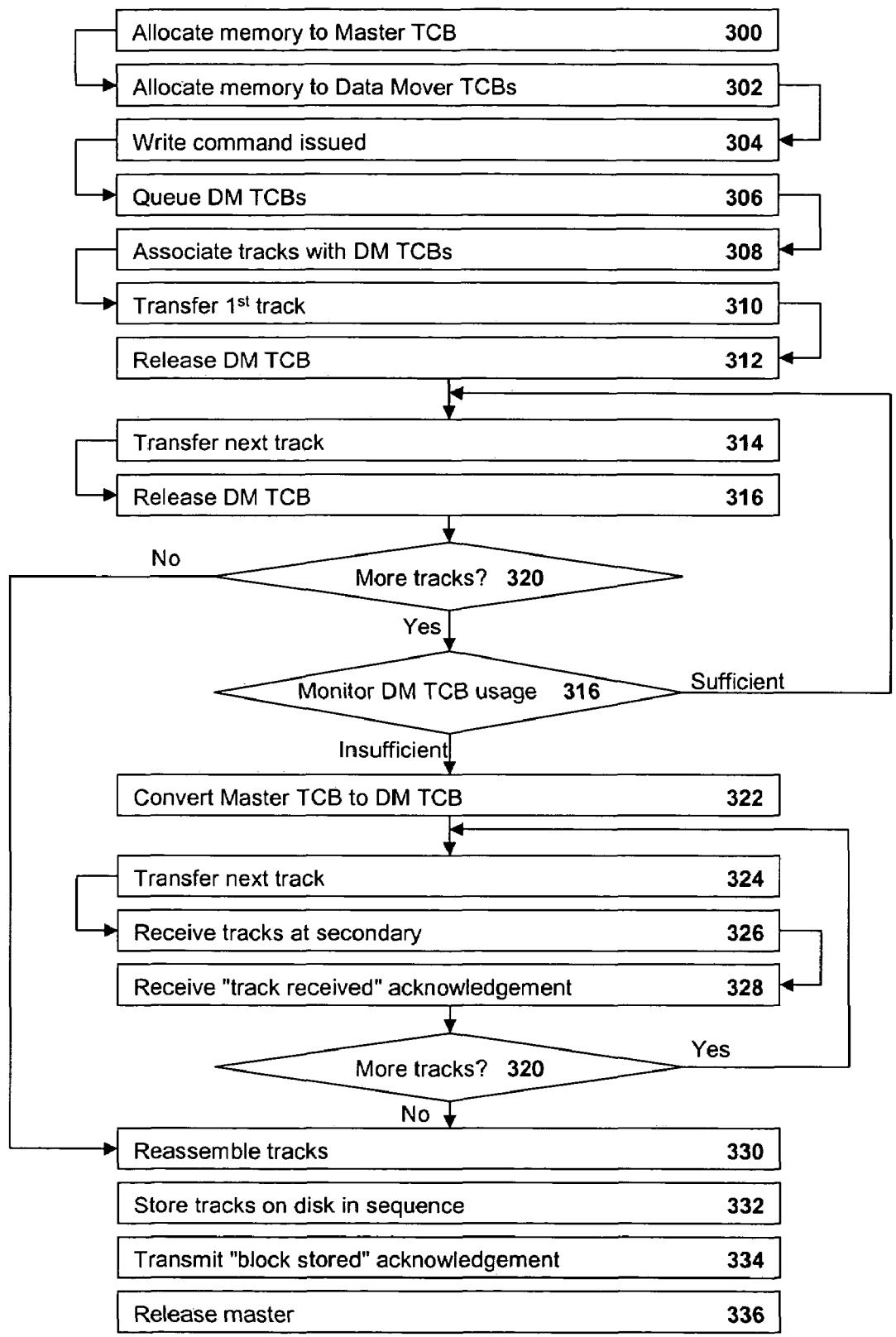
FIG. 3A is a flow chart of a method of the present invention.
Figure 4:
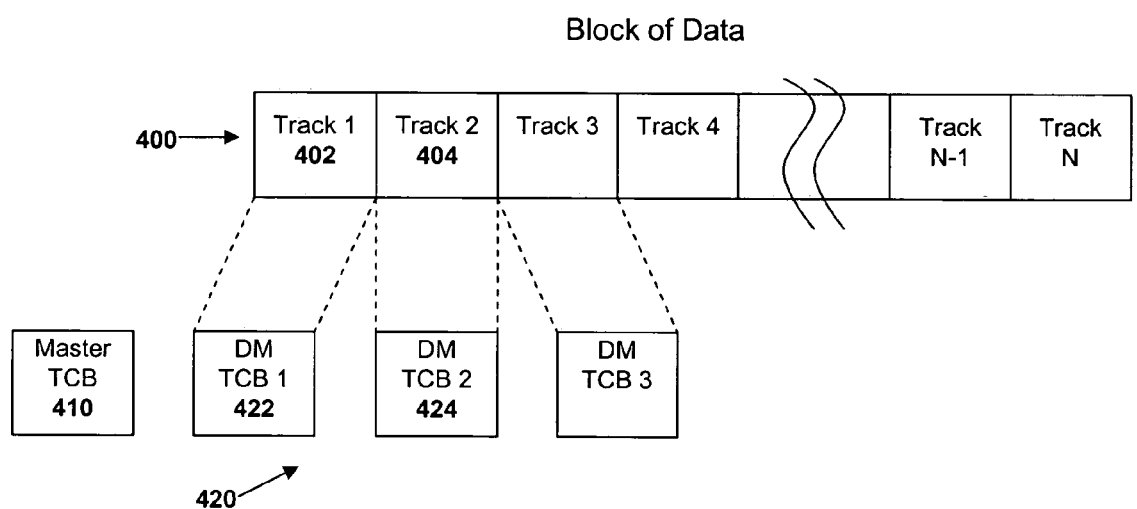
FIG. 4 illustrates tracks into which a block of data has been divided, a master TCB and data mover TCBs with which the tracks are transferred.

In operation, a block of data 400 (FIG. 4) at the host 210 is divided into substantially equal-size tracks which are transferred to the primary storage controller 220 to be stored in the storage device 228. Referring to the flow chart of FIG. 3A, as tracks arrive at the primary storage controller 220, memory space 224 in the primary storage controller 220 is allocated to a master TCB 410 (step 300) and to a plurality of data mover TCBs 420 (step 302). As part of a PPRC write command issued by the primary storage controller 220 to commence a write operation to transfer the block of data 400 to the secondary storage controller 240 (step 304), the data mover TCBs 420 are placed in a queue associated with the master TCB 410 (step 306). As tracks arrive from the host 210, each is associated with one of the data mover TCBs 420 (step 308).

The master mover TCB 410 directs that a first track 402 be transferred using a first data mover TCB 422 over a first link 232 through which the primary and secondary storage controllers 220 and 240 are coupled (step 310). The first data mover TCB 422 is released (step 312) and may be used during the transfer of another block of data. Prior to receiving an acknowledgment from the secondary storage controller 240 that the first track 402 was successfully received, the next track 404 is transferred using a next data mover TCB 424 (step 314) over the same link 232; the second data mover TCB is then released (step 316).

Usage of the data mover TCBs 420 is monitored by a resource management algorithm (step 318). If a sufficient number of data mover TCBs 420 are available to complete the transfer of the block of data 400, transfer of the remaining tracks continues as before until all of the tracks have been transferred (step 320). However, if an insufficient number of data mover TCBs 420 are available or if the supply of data mover TCBs 420 is exhausted, the master TCB 410 becomes a data mover TCB (step 322) and the remaining tracks are transferred serially (step 324) with the transfer of a next track delayed until the track has been received (step 326) and an acknowledgment from the secondary storage controller 240 is received (step 328).

At the secondary storage control unit 240, the tracks are received (step 326), an acknowledgment transmitted (step 328) and the tracks are reassembled into the block of data 400 (step 330) which is ultimately stored on the storage device 248 (step 330), thereby completing the write operation. Upon receipt by the primary storage controller 220 from the secondary storage controller 240 that all of the tracks have been successfully received (step 334), the master TCB 410 is released (step 336) and may be used for the transfer of another block of data.

Figure 3B:
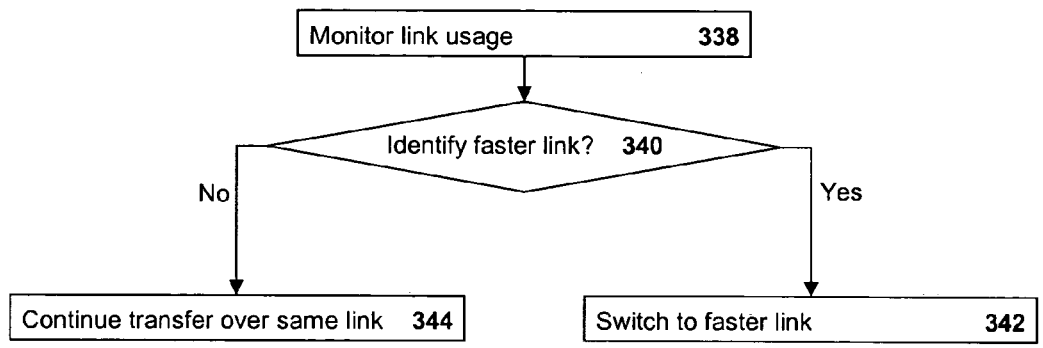
FIG. 3B is a flow chart of a method of the present invention.

Referring to FIG. 3B, in addition to monitoring usage of the data mover TCBs 420, usage of the links 232, 234 and 236 coupling the primary and secondary storage controllers 220 and 240 is also monitored (step 338) to determine which link may provide the most efficient (such as the fastest) transfer of data. If a link is identified which is more efficient than the link currently being used (step 340), transfer of tracks may be switched to the more efficient link (step 342). Preferably, the switch to a more efficient link occurs after the primary storage controller 220 has received an acknowledgment from the secondary storage controller 240 that a first group or group of tracks has been successfully received (340). Otherwise, the tracks of data may not all arrive in the proper order (some later tracks transferred over the more efficient link, may arrive before some earlier tracks transferred over the original link) and the secondary storage controller 240 will have to rearrange the tracks into the original order. If no more efficient link is identified, transfer of the tracks continues over the original link (step 344).

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method for transferring data from a primary storage controller to a secondary storage controller linked to the primary storage controller by a plurality of links, the method comprising:

dividing a block of data into a plurality of substantially equal-size tracks;

receiving a command to transfer the block of data from the primary storage controller to a secondary storage controller;

allocating memory space in the primary storage controller to a master task control block (TCB) to supervise the transfer of the block of data;

allocating memory space in the primary storage controller to a plurality of data mover TCBs;

placing the plurality of data mover TCBs in a queue associated with the master TCB;

associating a first track of the block of data with a corresponding first data mover TCB of the plurality of data mover TCBs;

transferring the first track to the secondary storage controller;

associating a second track of the block of data with a corresponding second data mover TCB of the plurality of data mover TCBs;

transferring the second track to the secondary controller in a piped fashion relative to the transfer of the first track;

continuing to associate tracks of the block of data to corresponding data mover TCBs of the plurality of data mover TCBs;

monitoring the usage of the data mover TCBs; and if an insufficient number of data mover TCBs are available to be associated with the remaining tracks of the block of data:

directing that the master TCB operate as a data mover TCB; and transferring the remaining tracks of the block of data to the secondary controller serially in a non-piped fashion.

2. The method of claim 1, further comprising continuing to transfer the remaining tracks to the secondary controller in a piped fashion relative to the transfer of the first track if a sufficient number of data mover TCBs are available to be associated with the remaining tracks of the block of data.

3. The method of claim 1, further comprising:

monitoring usage of a plurality of links between the primary storage controller and the secondary storage controller; and determining which of the plurality of links is capable of transferring tracks most efficiently.

4. The method of claim 3, further comprising transferring a first group of less than all of the tracks of the block of data to the secondary storage controller over a first most efficient link.

5. The method of claim 4, further comprising:

determining if a second link is capable of transferring tracks more efficiently than the first link;

transferring a second group of the tracks of the block of data to the secondary storage controller over the second link if the second link is capable of transferring tracks more efficiently than the first link; and transferring the second group of the tracks of the block of data to the secondary storage controller over the first link if the second link is not capable of transferring tracks more efficiently than the first link.

6. The method of claim 5, wherein transferring the second group of tracks over the second link begins following completion of the transfer of the first group of tracks over the first link.

7. The method of claim 5, wherein transferring the second group of tracks over the second link begins prior to completion of the transfer of the first group of tracks over the first link.

8. The method of claim 1, further comprising:
receiving the plurality of tracks at the secondary storage controller; and
reassembling the block of data from the plurality of tracks.

9. The method of claim 8, further comprising releasing each data mover TCB upon the successful transfer of the associated track to the secondary storage controller.

10. A peer-to-peer remote copy storage system, comprising:
a primary storage controller;
a secondary storage controller;
a plurality of links coupling the primary storage controller with the secondary storage controller;
a plurality of substantially equal-size tracks collectively comprising a block of data to be transferred from the primary storage controller to the secondary storage controller;
a plurality of data mover task control blocks (TCBs);
a master TCB operable to supervise the transfer of the plurality of tracks;
means for associating a first track of the block of data with a corresponding first data mover TCB of the plurality of data mover TCBs;
means for transferring the first track to the secondary storage controller;
the means associating the first track with the first data mover TCB including means for associating a second track of the block of data with a corresponding second data mover TCB of the plurality of data mover TCBs;
the means for transferring the first track including means for transferring the second track to the secondary controller in a piped fashion relative to the transfer of the first track;
the means for associating the first track with the first data mover TCB including means for continuing to associate tracks of the block of data to corresponding data mover TCBs of the plurality of data mover TCBs;
means for monitoring the usage of the data mover TCBs; and
if an insufficient number of data mover TCBs are available to be associated with the remaining tracks of the block of data:
means for directing that the master TCB operate as a data mover TCB; and
means for transferring the remaining tracks of the block of data to the secondary controller serially in a non-piped fashion.

11. The system of claim 10, wherein the means for transferring the first track includes means for continuing to transfer the remaining tracks to the secondary controller in a piped fashion relative to the transfer of the first track if a sufficient number of data mover TCBs are available to be associated with the remaining tracks of the block of data.

12. The system of claim 10, further comprising:

means for monitoring usage of a plurality of links between the primary storage controller and the secondary storage controller; and
means for determining which of the plurality of links is capable of transferring tracks most efficiently.

13. The system of claim 12, wherein the means for transferring the first track includes means for transferring a first group of less than all of the tracks of the block of data to the secondary storage controller over a first most efficient link.

14. The system of claim 13, further comprising means for determining if a second link is capable of transferring tracks more efficiently than the first link, wherein:
the means for transferring the first track includes means for transferring a second group of the tracks of the block of data to the secondary storage controller over the second link if the second link is capable of transferring tracks more efficiently than the first link; and
the means for transferring the first track includes means for transferring the second group of the tracks of the block of data to the secondary storage controller over the first link if the second link is not capable of transferring tracks more efficiently than the first link.

15. The system of claim 14, wherein transferring the second group of tracks over the second link begins following completion of the transfer of the first group of tracks over the first link.

16. The system of claim 14, wherein transferring the second group of tracks over the second link begins prior to completion of the transfer of the first group of tracks over the first link.

17. The system of claim 10, further comprising:
means for receiving the plurality of tracks at the secondary storage controller; and
means for reassembling the block of data from the plurality of tracks.

18. The system of claim 17, further comprising means for releasing the data mover TCBs upon successful transfer of all of the tracks of the block of data to the secondary storage controller.

19. A peer-to-peer remote copy primary storage controller coupled to a secondary storage controller through a plurality of links, the primary storage controller comprising:
a plurality of substantially equal-size tracks collectively comprising a block of data to be transferred from the primary storage controller to the secondary storage controller;
a plurality of data mover task control blocks (TCBs);
a master TCB operable to supervise the transfer of the plurality of tracks;
means for associating a first track of the block of data with a corresponding first data mover TCB of the plurality of data mover TCBs;
means for transferring the first track to the secondary storage controller;
the means associating the first track with the first data mover TCB including means for associating a second track of the block of data with a corresponding second data mover TCB of the plurality of data mover TCBS;
the means for transferring the first track including means for transferring the second track to the secondary controller in a piped fashion relative to the transfer of the first track;
the means for associating the first track with the first data mover TCB including means for continuing to associate tracks of the block of data to corresponding data mover TCBs of the plurality of data mover TCBs;

means for monitoring the usage of the data mover TCBs; and if an insufficient number of data mover TCBs are available to be associated with the remaining tracks of the block of data:
    means for directing that the master TCB operate as a data mover TCB; and
    means for transferring the remaining tracks of the block of data to the secondary controller serially in a non-piped fashion.

20. The primary storage controller of claim 19, wherein the means for transferring the first track includes means for continuing to transfer the remaining tracks to the secondary controller in a piped fashion relative to the transfer of the first track if a sufficient number of data mover TCBs are available to be associated with the remaining tracks of the block of data.

21. The primary storage controller of claim 19, further comprising:
    means for monitoring usage of the plurality of links; and
    means for determining which of the plurality of links is capable of transferring tracks most efficiently.

22. The primary storage controller of claim 21, wherein the means for transferring the first track includes means for transferring a first group of less than all of the tracks of the block of data to the secondary storage controller over a first most efficient link.

23. The primary storage controller of claim 22, further comprising, means for determining if a second link is capable of transferring tracks more efficiently than the first link, wherein:
    the means for transferring the first track includes means for transferring a second group of the tracks of the block of data to the secondary storage controller over the second link if the second link is capable of transferring tracks more efficiently than the first link; and
    the means for transferring the first track includes means for transferring the second group of the tracks of the block of data to the secondary storage controller over the first link if the second link is not capable of transferring tracks more efficiently than the first link.

24. The primary storage controller of claim 19, further comprising means for releasing a data mover TCB upon the successful transfer of the associated track to the secondary storage controller.

25. A computer program product of a computer readable medium usable with a programmable computer, the computer program product having computer-readable code embodied therein for transferring data from a primary PPRC storage controller to a secondary storage controller over any of a plurality of links, the computer-readable code comprising instructions for:
    dividing a block of data into a plurality of substantially equal-size tracks;
    receiving a command to transfer the block of data from the primary storage controller to a secondary storage controller;
    allocating memory space in the primary storage controller to a master task control block (TCB) to supervise the transfer of the block of data;
    allocating memory space in the primary storage controller to a plurality of data mover TCBs;
    placing the plurality of data mover TCBs in a queue associated with the master TCB;
    associating a first track of the block of data with a corresponding first data mover TCB of the plurality of data mover TCBs;
    transferring the first track to the secondary storage controller;
    associating a second track of the block of data with a corresponding second data mover TCB of the plurality of data mover TCBs;
    transferring the second track to the secondary controller in a piped fashion relative to the transfer of the first track;
    continuing to associate tracks of the block of data to corresponding data mover TCBs of the plurality of data mover TCBs;
    monitoring the usage of the data mover TCBs; and
    if an insufficient number of data mover TCBs are available to be associated with the remaining tracks of the block of data:
        directing that the master TCB operate as a data mover TCB; and
        transferring the remaining tracks of the block of data to the secondary controller serially in a non-piped fashion.

26. The computer program product of claim 25, further comprising instructions for continuing to transfer the remaining tracks to the secondary controller in a piped fashion relative to the transfer of the first track if a sufficient number of data mover TCBs are available to be associated with the remaining tracks of the block of data.

27. The computer program product of claim 25, further comprising instructions for:
    monitoring usage of the plurality of links between the primary storage controller and the secondary storage controller; and
    determining which of the plurality of links is capable of transferring tracks most efficiently.

28. The computer program product of claim 27, further comprising instructions for transferring a first group of less than all of the tracks of the block of data to the secondary storage controller over a first most efficient link.

29. The computer program product of claim 28, further comprising instructions for:
    determining if a second link is capable of transferring tracks more efficiently than the first link;
    transferring a second group of the tracks of the block of data to the secondary storage controller over the second link if the second link is capable of transferring tracks more efficiently than the first link; and
    transferring the second group of the tracks of the block of data to the secondary storage controller over the first link if the second link is not capable of transferring tracks more efficiently than the first link.

30. The computer program product of claim 25, further comprising instructions for:
    receiving the plurality of tracks at the secondary storage controller; and
    reassembling the block of data from the plurality of tracks.

31. The computer program product of claim 30, further comprising instructions for releasing each data mover TCB upon the successful transfer of the associated track to the secondary storage controller.

* * * * *